United States Patent
Köhler et al.

(10) Patent No.: US 7,845,209 B2
(45) Date of Patent: Dec. 7, 2010

(54) ARRANGEMENT FOR MONITORING AN INSTALLATION FOR THERMAL STRESSES

(75) Inventors: Jens Köhler, Mannheim (DE); Hans-Peter Merkel, Schriesheim (DE)

(73) Assignee: ABB AG, Mannheim (DE)

(*) Notice: Subject to any disclaimer, the term of this patent is extended or adjusted under 35 U.S.C. 154(b) by 531 days.

(21) Appl. No.: 11/664,842

(22) PCT Filed: Sep. 28, 2005

(86) PCT No.: PCT/EP2005/010444
§ 371 (c)(1),
(2), (4) Date: Apr. 6, 2007

(87) PCT Pub. No.: WO2006/042619
PCT Pub. Date: Apr. 27, 2006

(65) Prior Publication Data
US 2007/0291819 A1    Dec. 20, 2007

(30) Foreign Application Priority Data
Oct. 15, 2004   (DE) .................. 10 2004 050 191

(51) Int. Cl.
*G01K 11/06* (2006.01)
*G01N 25/00* (2006.01)
(52) U.S. Cl. .............. 73/23.35; 73/23.2; 73/25.01
(58) Field of Classification Search .......... 73/23.2, 73/23.35, 25.01, 25.05
See application file for complete search history.

(56) References Cited

U.S. PATENT DOCUMENTS 6,166,356 A * 12/2000 Carlson .................. 219/497
6,188,035 B1    2/2001 Nichols

FOREIGN PATENT DOCUMENTS

| DE | 296 09 351 U1 | 11/1996 |
|---|---|---|
| DE | 100 00 607 A1 | 11/2000 |
| EP | 0 092 027 A2 | 10/1983 |
| GB | 2 301 231 A | 11/1996 |
| JP | 3-188339 | 8/1991 |
| JP | 3-242520 | 10/1991 |
| JP | 3-261835 A | 11/1991 |
| JP | 0666648 A | 3/1994 |

OTHER PUBLICATIONS

Ross, J.F. et al., "A New Method for Protection Against Electrical Overheating Using a Sacrificial Coating and a CHEMFET Gas Sensor", Journal of Physics E: Scientific Instruments, vol. 7, No. 7, Jul. 1 1986, pp. 536-540.*

* cited by examiner

*Primary Examiner*—Daniel S Larkin
(74) *Attorney, Agent, or Firm*—Buchanan Ingersoll & Rooney PC

(57) ABSTRACT

An arrangement is disclosed for monitoring an installation for thermal loading, having at least one sensor and having evaluation electronics which are connected to the at least one sensor. An indicator substance is arranged at least one point or on at least one component in the installation. The amount of the indicator substances released into the environment is temperature-dependent. The indicator substance can be detected by the at least one sensor.

23 Claims, 2 Drawing Sheets

ARRANGEMENT FOR MONITORING AN INSTALLATION FOR THERMAL STRESSES

The invention relates to an arrangement for monitoring an installation, in particular a switchgear installation for thermal loading.

BACKGROUND

It is generally known that, for example, switchgear installations are monitored for specific thermal loads, for safety reasons. The monitoring is based on the idea that particular thermal loading can occur in particular at specific points in the switchgear installations, for example at the moving contacts of a switch or at other points which, on the basis of empirical values, are subject to thermal loading or even overloading comparatively frequently.

One generally known possible way to monitor these critical points is to fit temperature sensors at all of these points, and to couple these temperature sensors to a monitoring system. If thermal overloading now occurs at one of these points, this is indicated by the temperature of the relevant component being raised, so that the temperature sensor which is arranged there transmits a corresponding signal to the monitoring device. In the case of an arrangement such as this, a comparatively high degree of complexity must be accepted, since thermal overloading can occur at a large number of points in the switchgear installation. This necessitates a correspondingly large number of sensors, and a correspondingly complex monitoring device. The wiring between the sensors and the monitoring device also means additional complexity.

Against the background of the abovementioned prior art, the object of the invention is to specify an arrangement for monitoring an installation for thermal loading, which is of a particularly simple design and at the same time ensures reliable monitoring.

SUMMARY

This object is achieved by the arrangement according to the invention for monitoring of an installation for thermal loading.

Accordingly, the arrangement according to the invention is characterized in that an indicator substance is arranged at at least one point or on at least one component in the installation, in that the amount of the indicator substance which is released into the environment is temperature-dependent, and in that the indicator substance can be detected by the at least one sensor.

The arrangement according to the invention for monitoring of an installation for thermal loading advantageously means that, for example, a complete switchgear installation can be monitored by only one sensor, in which case the number of points to be monitored is in principle unlimited. For example, it is quite easily possible for the indicator substance to be arranged on a large number of components in the switchgear installations, in particular on those components where thermal loading can be expected. In this case, it is sufficient for the sensor to be arranged in the area of the switchgear installation such that the indicator substance can in fact be detected. If a plurality of sensors are used, the arrangement according to the invention can be extended and used more flexibly.

The distance between the sensor and the indicator substance affects only the reaction time for detection of thermal loading, but not its fundamental detection. The indicator substance cannot be detected, however, when it is arranged within encapsulation while the sensor is located outside the encapsulation.

This advantageously results in decoupling between the number of sensors and the number of points and/or components to be monitored in an installation. The arrangement according to the invention for monitoring of a switchgear installation for thermal overloading is accordingly advantageously simpler than the already known arrangements.

In one advantageous refinement, the at least one sensor is a gas chromatograph or a gas sensor.

A gas chromatograph has the particular advantage that it can be adjusted for an indicator substance or for a group of substances which are used as the indicator substance, so that the indicator substance as such can also be replaced by a different indicator substance throughout a lengthy life of the switchgear installation. All that is then necessary is to adjust the gas chromatograph for the new indicator substance. In this case, in principle, all substances which change at least partially to the gaseous state in the temperature range which is intended for monitoring of the installation may be considered for use as the indicator substance.

One particular advantage of a gas sensor as the sensor for the arrangement according to the invention for monitoring of an installation for thermal loading is that a gas sensor is comparatively easy to obtain, so that the arrangement according to the invention can be designed particularly cost-effectively. Furthermore, gas sensors are available for a large number of different substances and, furthermore, can be designed for virtually any desired substance, in particular for aromatic substances, and in principle gas sensors can be matched to any substance whose detection is desired. With the large number of gas sensors which already exist nowadays, for example the GGS 100 QT Universal Gas Sensor from the company Umwelt Sensor Technik (UST) GmbH, Geschwenda which, for example, is particularly suitable for the detection of bromine, there is, however, no problem in selection of an appropriate indicator substance, for example a paint which releases bromine when heat is supplied to it, for use in a low-voltage switchgear installation.

The GGS 3000 gas sensor from the same company may also be used, in particular for detection of hydrocarbons (CxHy). By way of example, polyacrylnitrile polyamide or polystyrene may then be used as the indicator substance, which are known to release hydrocarbons when they are heated.

In one advantageous development of the arrangement according to the invention, the sensor has a ventilation unit, which passes a predetermined gas flow from the environment over the detector element of the sensor.

This means that a specific, predeterminable, volume flow of the gas which surrounds the sensor is passed over the detector element. This forced convection shortens the detection time for a thermal stress that is to be detected.

Furthermore, the sensor is supplied with a uniform gas flow, so that the accuracy of the sensor is in this way increased.

The indicator substance itself can be applied to the appropriate components which are to be monitored. However, it is also within the scope of the invention for the indicator substance to be mixed with a carrier medium.

This carrier medium is, in particular, a substance used in the installation or the switchgear installation. In the case of moving components, such as the contacts of a switching device, the corresponding lubricant can be used as the carrier medium, and is applied in the area of the contacts.

However, it is also feasible for the indicator substance to be mixed with a paint or varnish, which can then be applied to the components to be monitored. A paint or varnish has the particular advantage that it can be applied over a large area to a large number of components without any problems, thus making it possible to greatly increase the number of components monitored.

One advantageous development of the invention provides that the limit value for detection of the thermal load can be set by selection of the indicator substance or by selection of the proportion of the indicator substance in the carrier medium.

Thus, in the end, an appropriate choice of the indicator substance allows the concentration of the indicator substance in the atmosphere surrounding it to be determined at a specific temperature.

A further refinement of the arrangement according to the invention is characterized in that an alarm as a result of thermal stressing being detected is produced only from a predeterminable threshold value for the concentration of the indicator substance in the atmosphere surrounding it.

In this way, it is possible to choose the cut-off temperature for definition of a thermal stress by setting the maximum permissible limit value to the concentration of the indicator substance in the atmosphere surrounding it.

Further advantageous refinements of the arrangement according to the invention can be found in the further dependent claims.

The invention, advantageous refinements and improvements of the invention, as well as particular advantages of the invention will be explained and described in more detail with reference to the exemplary embodiments, which are illustrated in the drawings, in which:

DETAILED DESCRIPTION

Figure 1:
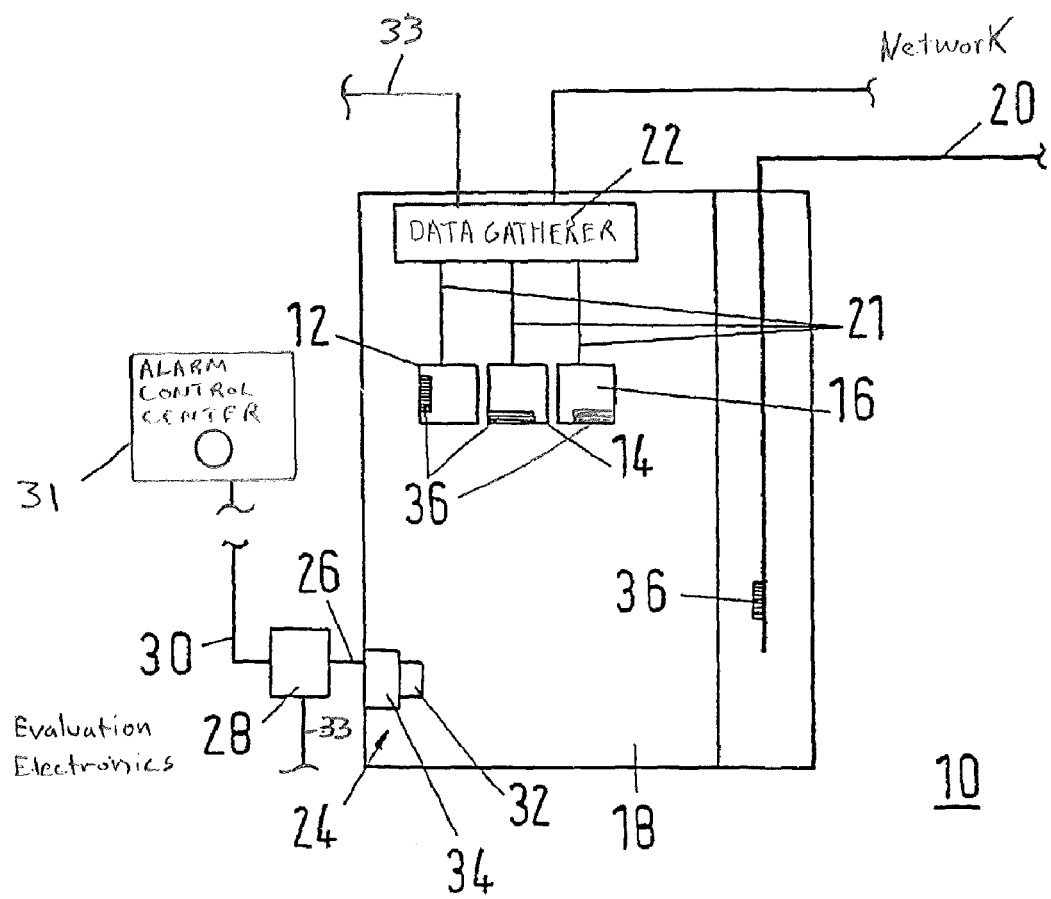
FIG. 1 shows a first arrangement for monitoring of a switchgear installation.

FIG. 1 shows a first arrangement 10 for monitoring a first switching device 12, a second switching device 14 and a third switching device 16, which are arranged in a switchgear cabinet 18. The first arrangement 10 is illustrated only as a schematic illustration of an arrangement according to the invention, without in the process indicating size relationships, or representing a detailed illustration.

A part of the switchgear cabinet 18 is compartmentalized off as a cable area from the remaining part of the switchgear cabinet 18, and is connected via a cable 20 to an electrical power supply, which is not illustrated here. In the chosen example, the switchgear cabinet 18 is intended to represent a switchgear installation in addition to its fittings.

A data gatherer 22, which is connected to each of the switching devices 12, 14, 16, is intended to illustrate only that the switching devices can process signals and/or data, and can interchange them with other devices.

A first gas sensor 24 is arranged within the switchgear cabinet 18 on one of the switchgear cabinet walls, and is connected by means of a first signal line 26 to evaluation electronics 28 which are arranged outside the switchgear cabinet 18. The evaluation electronics 28 may, however, also be arranged within the switchgear cabinet 18, without any problems.

The evaluation electronics 28 are designed such that the signals received from the gas sensor 24 are detected and preprocessed. Furthermore, the evaluation electronics 28 may be switched off, such that, if predetermined limit values are exceeded, alarm signals are transmitted via a second signal line 30 to an alarm control center 31, in this figure, or the preprocessed signals and values are passed to a process control system, so that any alarms or overshoots of limit values can be detected there.

The gas sensor 24 may also advantageously be connected to the data gatherer 22 via data line 33. The gas sensor data is then passed via the data gatherer to a data network, so that the evaluation electronics 28 can be connected to a different point in the data network. However, it is also possible for the evaluation electronics 28 to be arranged in the area near to the gas sensor 24, and for a fault signal to be defined as its output signal, and to be transmitted to the connected data gatherer 22.

The sensor 24 itself has a sensor element 32 which is arranged on a base element 34. In this case, the sensor element 32 makes direct contact with the surrounding air in the switchgear cabinet 18, while the base element 34 ensures easy installation of the sensor 24, as well as allowing easy electrical connection of the sensor element 32.

An indicator substance 36, which is intended to be mixed with a paint or varnish, is also shown in the illustrated switching devices 12, 14, 16 in this example. In order to illustrate the fact that the indicator substance 36 can be arranged at different points on the switching devices 12, 14, 16, the indicator substance 36 has been arranged at different positions on the respective switching devices 12, 14, 16, symbolically representing, for example, the arrangement comprising contacts, cables and so on.

In this case, the individual elements of the arrangement according to the invention interact as follows. The indicator substance 36 is essentially bound in its carrier medium, specifically the paint or varnish. A certain proportion of the indicator substance 36 at the same time diffuses into the air surrounding it. After a certain time, a specific concentration of the indicator substance occurs there. This concentration is determined by the gas sensor 24 and the evaluation electronics 28. In this case, the currently available gas sensors are sufficiently sensitive that, in some case, even one molecule of the indicator substance is sufficient to allow it to be detected by the gas sensor.

The concentration of the indicator substance in the air surrounding it is dependent on the temperature of the indicator substance. If the temperature of the indicator substance rises, a greater amount is released from the paint or varnish, leading to a higher concentration in the air surrounding it. A temperature rise such as this can be initiated, in particular, by thermal stressing or overstressing, that is to say a temperature rise in the component on which the indicator substance, to be precise the paint or varnish, is located. A threshold value can then be predetermined, for example, in the gas sensor 24 or in the evaluation electronics 28, which corresponds with a maximum permissible temperature on the component, and which initiates an alarm when it is exceeded.

Figure 2:
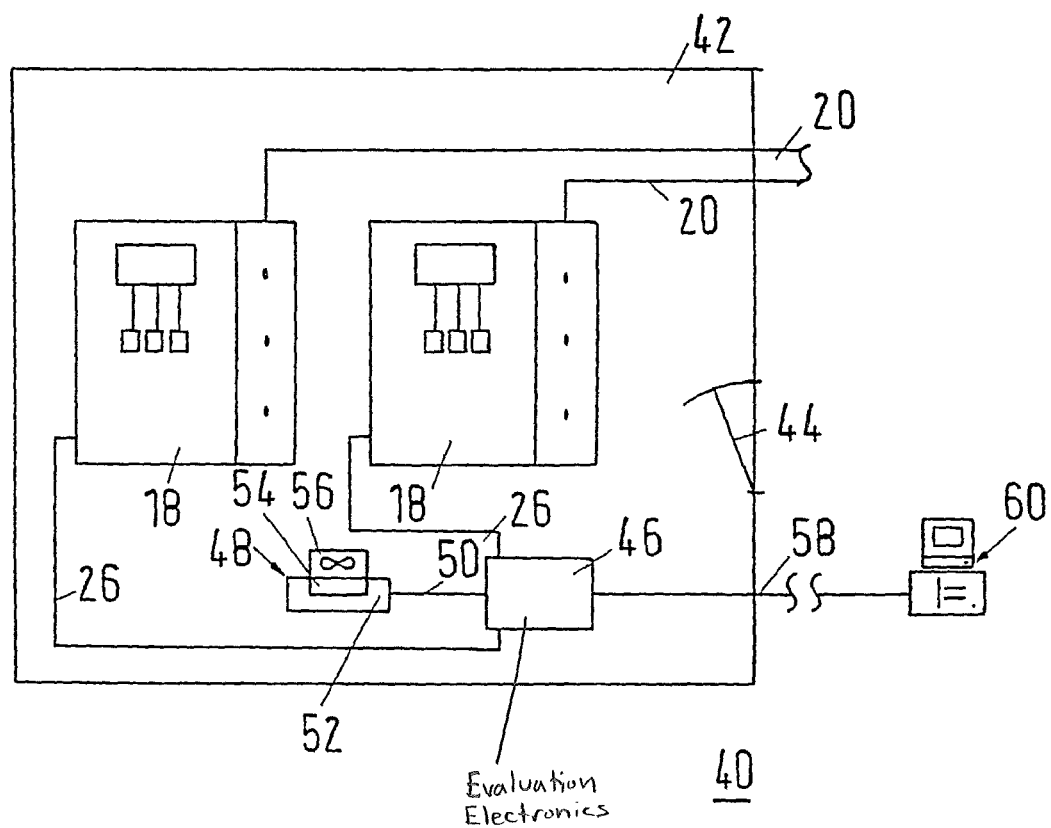
FIG. 2 shows a second arrangement for monitoring of a switchgear installation for thermal overloading.

FIG. 2 shows a second arrangement 40 for monitoring two switchgear cabinets 18 which are arranged in a room 42 which can in turn be accessed via a door 44. The components which are used in this figure, and which were also used in FIG. 1, are provided with corresponding identical reference numerals.

In this example as well, the switchgear cabinets 18 are connected by a cable 20 to devices or systems outside the room 42. The first signal lines 26 of the two switchgear cabinets 18 are connected to an evaluation device 46, which has comparable functions and tasks to the evaluation electronics 28 shown in FIG. 1. However, in the case of the evaluation device 46, the signals from two gas sensors 24 in the switchgear cabinets 18 as well as a further signal from a further gas sensor 48 are processed, and are passed through the third signal line 50 to the evaluation device 46.

The further gas sensor 48 has a basic component 52 in which a sensor component 54 has been integrated so that, overall, this results in a more space-saving further gas sensor 48, in comparison to the gas sensor 24. In addition, a microfan 56 is fitted directly to that surface of the sensor component 54 which faces outwards, so that the air flow which is produced by the microfan 56 blows directly onto the sensor area of the sensor component 54. This results in an airflow, which is governed by the size of the microfan 56, being passed continuously over the sensor surface of the sensor component 54, and in this way improving the monitoring of the further gas sensor 48 by forced convection.

The advantage of an arrangement such as this, as the second arrangement 40 shows, is that, on the one hand, the switchgear cabinets 18 are individually monitored, so that any occurrences can be localized quickly. On the other hand, the further gas sensor 48 carries out monitoring in the room 42, in which further components can be arranged which likewise must or should be monitored for temperature loads. However, this is not shown in the figure.

Finally, the further gas sensor 48 is also connected by means of a data line 58 to a process control system 60, which in this case is assumed to be represented by a computer symbol. This ensures that the evaluation device 46 can feed either the signals, messages, alarms or limit-value overshoots and so on to a higher-level control system. This control system may, for example, be the process control system for the entire installation, or else a fire-protection monitoring system.

LIST OF REFERENCE SYMBOLS

10 First arrangement
12 First switching device
14 Second switching device
16 Third switching device
18 Switchgear cabinet
20 Cable
22 Data gatherer
24 Gas sensor
26 First signal line
28 Evaluation electronics
30 Second signal line
32 Sensor element
34 Base element
36 Indicator substance
40 Second arrangement
42 Room
44 Door
46 Evaluation device
48 Further gas sensor
50 Third signal line
52 Base component
54 Sensor component
56 Microfan
58 Data line
60 Process control system

The invention claimed is:

1. An arrangement for monitoring an installation for thermal loading, comprising:
    at least one sensor;
    evaluation electronics which are connected to the at least one sensor;
    an indicator substance arranged at least one point or on at least one component in the installation, the amount of the indicator substance which is released into the environment being temperature-dependent, the indicator substance can be detected by the at least one sensor; and
    a fan fitted onto a surface of the at least one sensor for passing the indicator substance released into the environment over a detector element of the sensor.

2. The arrangement as claimed in claim 1, wherein the at least one sensor is a gas chromatograph or a gas sensor.

3. The arrangement as claimed in claim 2, wherein the at least one sensor is arranged in an area of the at least one point or of the at least one component to enable detection of the indicator substance released into the environment.

4. The arrangement as claimed in claim 1, wherein the at least one sensor is arranged in an area of the at least one point or of the at least one component to enable detection of the indicator substance released into the environment.

5. The arrangement as claimed in claim 4, wherein the indicator substance is mixed with a substance used in a switchgear installation, including one of a lubricant for moving components, a paint or varnish, an insulating material or an insulating gas, or a plurality of carrier media.

6. The arrangement as claimed in claim 1, wherein the indicator substance is mixed with a carrier medium, including one of a lubricant for moving components, a paint or varnish, an insulating material or an insulating gas, or a plurality of carrier media.

7. The arrangement as claimed in claim 6, wherein the indicator substance as a component of a carrier medium can be applied to the at least one point or to the at least one component.

8. The arrangement as claimed in claim 1, wherein the indicator substance can be applied to the at least one point or to the at least one component.

9. The arrangement as claimed in claim 8, wherein a limit value for detection of the thermal loading can be set by selection of the indicator substance or by selection of the proportion of the indicator substance in a carrier medium.

10. The arrangement as claimed in claim 1, wherein a limit value for detection of a thermal load can be set by selection of the indicator substance or by selection of the proportion of the indicator substance in a carrier medium.

11. The arrangement as claimed in claim 10, wherein a limit value for detection of thermal overloading can be preset by presetting a maximum concentration of the indicator substance in the environmental air.

12. The arrangement as claimed in claim 1, wherein a limit value for detection of thermal overloading can be preset by presetting a maximum concentration of the indicator substance in the environmental air.

13. The arrangement as claimed in claim 12, wherein a signal per unit time from the at least one sensor is a measure of the thermal loading.

14. The arrangement as claimed in claim 1, wherein the signals from the at least one sensor are a measure of the thermal loading.

15. The arrangement as claimed in claim 14, wherein the installation is provided in a cabinet, and wherein the at least one sensor is arranged within the cabinet.

16. The arrangement as claimed in claim 1, wherein the installation is provided in a cabinet, and wherein the at least one sensor is arranged within the cabinet.

17. The arrangement as claimed in claim 16, wherein an alarm as a result of thermal stressing being detected is produced only from a predeterminable threshold value for the concentration of the indicator substance in the atmosphere surrounding the indicator substance.

18. The arrangement as claimed in claim 1, wherein an alarm as a result of thermal stressing being detected is produced only from a predeterminable threshold value for the concentration of the indicator substance in the atmosphere surrounding the indicator substance.

19. The arrangement as claimed in claim 18, wherein a dead time, a time interval from an occurrence of thermal stressing to the detection of thermal stressing, is dependent on the distance between the indicator substance points to be monitored and the at least one sensor.

20. The arrangement as claimed in claim 1, wherein a time interval from an occurrence of thermal stressing to the detection of thermal stressing, is dependent on the distance between the indicator substance points to be monitored and the at least one sensor.

21. The arrangement as claimed in claim 1, wherein the indicator substance is one of bromide, polyacrylnitrile polyamide or polystyrene.

22. An arrangement for monitoring a switchgear installation for thermal loading, comprising:
   at least one sensor to detect an indicator substance;
   evaluation electronics which are connected to the at least one sensor, wherein the indicator substance is arranged in the installation, the amount of the indicator substance which is released into the environment being temperature-dependent; and
   a fan fitted onto a surface of the at least one sensor for passing the indicator substance released into the environment over a detector element of the sensor.

23. The arrangement as claimed in claim 22, wherein the indicator substance is one of bromine, polyacrylnitrile polyamide or polystyrene.

* * * * *